United States Patent [19]

Sasagaki et al.

[11] Patent Number: 5,177,526

[45] Date of Patent: Jan. 5, 1993

[54] SYSTEM FOR INPUTTING INFORMATION INTO CAMERA

[75] Inventors: Nobuaki Sasagaki; Seiichi Yasukawa, both of Kawasaki, Japan

[73] Assignee: Nikon Corporation, Tokyo, Japan

[21] Appl. No.: 546,949

[22] Filed: Jul. 2, 1990

[30] Foreign Application Priority Data

Jul. 7, 1989 [JP] Japan .................................. 1-175958

[51] Int. Cl.⁵ .......................................... G03B 17/00
[52] U.S. Cl. .................................................. 354/432
[58] Field of Search ............... 354/402, 412, 429, 432, 354/289.1, 289.12, 105, 106

[56] References Cited

U.S. PATENT DOCUMENTS 4,853,733  8/1989  Watanabe et al. ................. 354/412
4,999,661  3/1991  Ueno et al. ........................ 354/402

Primary Examiner—W. B. Perkey
Attorney, Agent, or Firm—Shapiro and Shapiro

[57] ABSTRACT

A system for inputting photography information into a camera, in which a chart having a pattern representing information to be input is provided as a photography object, and the pattern is read through a photographing lens by a plurality of light receiving elements provided in the camera and ordinarily used for automatic focusing or exposure control. The pattern information is decoded into digital data which is stored in a memory and which is used for exposure control and so on.

9 Claims, 4 Drawing Sheets

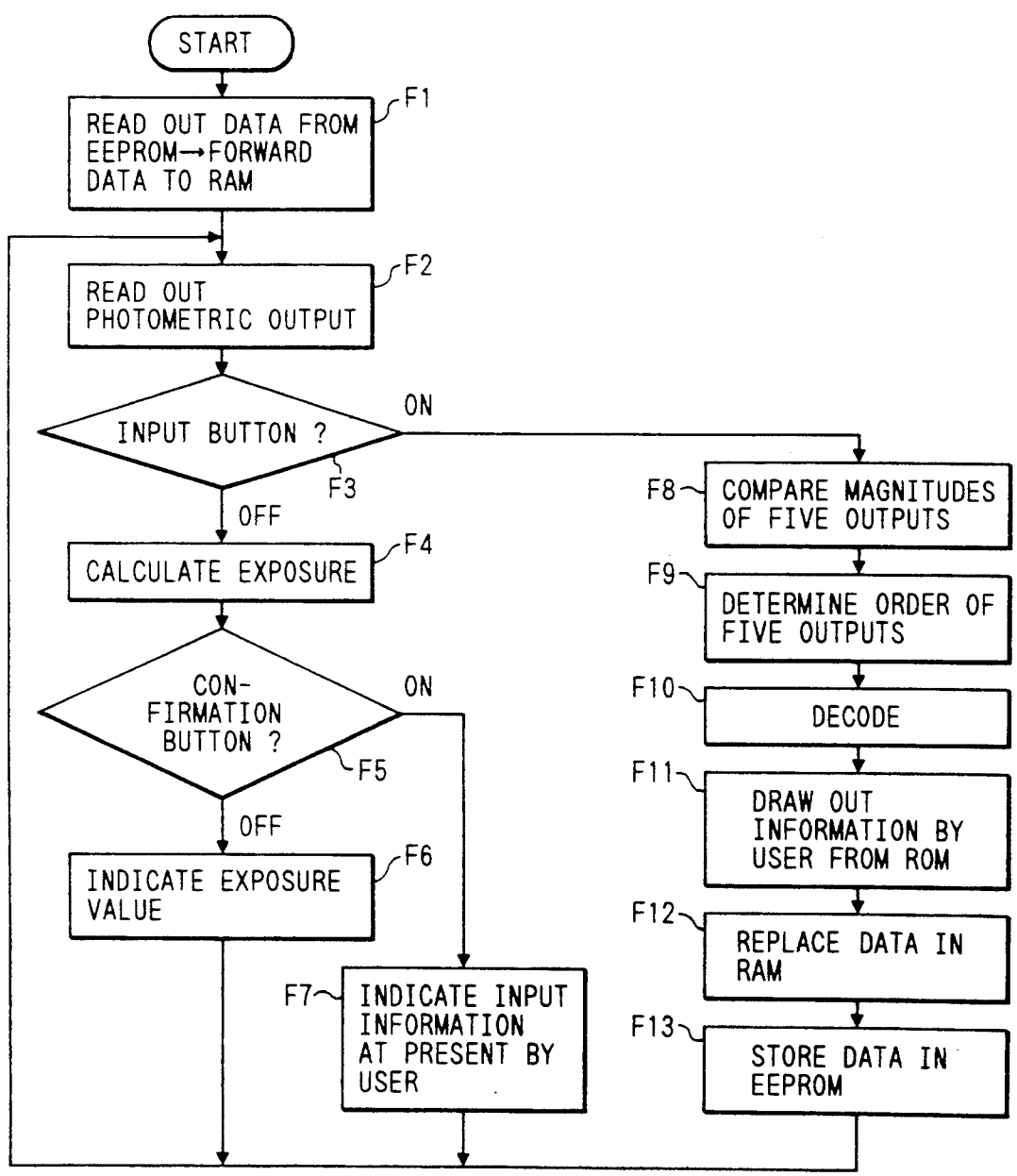

SYSTEM FOR INPUTTING INFORMATION INTO CAMERA

BACKGROUND OF THE INVENTION

1. Field of the Invention

This invention relates to a system for optically inputting various categories of photography information into a camera.

2. Related Background Art

Conventionally, various categories of photography control information used during photographing, e.g., information on program line setting at the time of program photography and information on selection of sound warning are input into a camera by the operator by means of operating buttons or operating dials provided on the camera.

Recently, an apparatus for inputting suitable photography information into a camera by setting a card incorporating ICs in the camera has also been proposed.

Where operating buttons or dials are used, the number of buttons or dials is increased as the number of categories of information is increased, which is disadvantageous in terms of operation facility.

Where an IC card is used, it is necessary for the camera to have an accommodation space in which the card is inserted as well as contacts for connection between ICs in the card and a microcomputer in the camera. As a result, the construction of the camera is complicated and the cost of the camera is increased.

SUMMARY OF THE INVENTION

In view of these problems, it is an object of the present invention to provide a camera information input system capable of inputting information by simple operations without making the camera construction complicated even if the amount of information is increased.

To achieve this object, according to one aspect of the present invention, there is provided an information inputting system comprising: a chart on which a divided pattern optically discriminable and corresponding to information set by a user is formed; a plurality of light receiving elements for focal point detection or exposure control photometry, the light receiving elements being capable of detecting the divided pattern through a photographing lens; an information input switch for inputting the information set by the user by means of the chart; a decoding means for decoding the information set by the user from the pattern detected by the light receiving elements to set the result of decoding in the camera, when the information input switch is operated.

In the thus constructed camera information inputting system in accordance with the present invention, a chart in which information to be input is expressed as a pattern is provided as a photography object, and the pattern is read through a photographing lens by the light receiving elements for automatic focusing or automatic exposure control provided in the camera, thus enabling the user to easily input and set photography information into the camera.

BRIEF DESCRIPTION OF THE DRAWINGS

FIG. 4 is a flow chart of the operation of the first embodiment under the control of a microcomputer;

DESCRIPTION OF THE PREFERRED EMBODIMENTS

Figure 1:
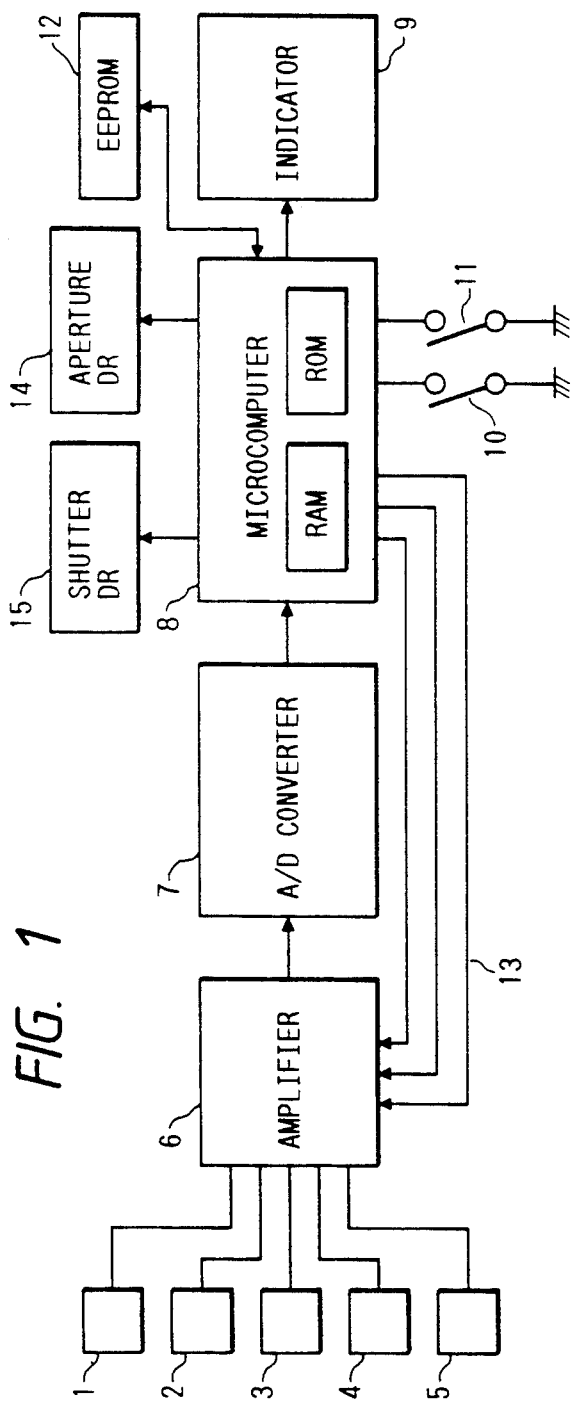
FIG. 1 is a block diagram of a first embodiment of the present invention.

FIG. 1 is a block diagram of a circuit of a camera in accordance with a first embodiment of the present invention.

Field photometry light receiving elements 1 to 5 shown in FIG. 1 are used for automatic exposure control and exposure calculation display. These light receiving elements are arrayed to effect photometry with respect to five regions on an imaging plane equivalent to the film surface. If the exposure area of the film is represented by a rectangular area 106 shown in FIG. 2, the five photometry regions for the light receiving elements 1 to 5 correspond to a central circular region 103 and peripheral four regions 101, 102, 104, and 105 having equal areas.

Outputs from the five light receiving elements 1 to 5 are input into an amplifier 6 to be amplified and logarithmically compressed and to be successively output through one output line according to a received light output changeover signal 13 supplied from a microcomputer 8. The output from the amplifier 6 is converted into a digital signal by an A/D converter 7 and is input into the microcomputer 8.

Ordinarily, for example, the microcomputer 8 calculates an exposure value from the supplied photometry output and outputs display data to a display means (indicator) 9 to display the results of calculation.

The microcomputer 8 incorporates a random access memory (RAM) in which various categories of information are stored, and a read only memory (ROM) for fixed storage.

A non-volatile memory 12 which is, for example, an electrically erasable and programmable ROM (EEPROM) exchanges data with the microcomputer 8. The memory content of the non-volatile memory 12 is not erased even if the power supply is cut off.

An information input switch 10 is used to input information, and a confirmation switch 11 is used to effect confirmation display of input information through the display means 9.

An aperture driving device 14 and a shutter driving device 15 are controlled on the basis of signals supplied from the microcomputer 8.

The operation of inputting categories of information used for photography into the camera in accordance with the present invention will be described below.

To input information in accordance with the present invention, a special chart on which information is encoded as a light-shade pattern is used.

Figure 3:
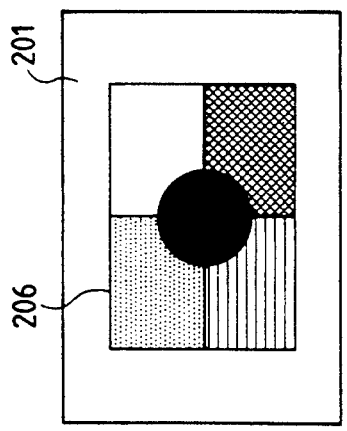
FIG. 3 is a diagram of a chart used in the first embodiment to input information set by the user.
Figure 2:
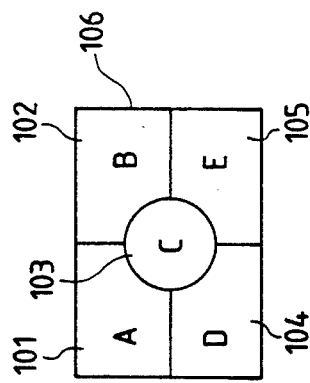
FIG. 2 is a diagram of a division pattern for photometry using light receiving elements.

FIG. 3 shows an example of a light-shade pattern chart 201 having light-shade patterns 206 distributed to five regions corresponding to the divided photometry regions for the light receiving elements shown in FIG. 2. The reflectivity of the light-shade pattern 206 is distinctly gradated in five steps with respect to the five regions. It is possible to express, by charts 201. 5 factorial = 120 items of information at the maximum by assigning items of input information to different luminance orders of the fives-region light-shade pattern 206.

One chart 201 prepared as shown in FIG. 3 is placed to be viewed through the camera to which a suitable lens is attached, and the direction and the range of the camera are adjusted so that the outer frame of the light-shade pattern 206 coincides with the finder field frame which generally coincides with the frame 106 indicating the photometry area as shown in FIG. 2.

In this state, the information input switch 10 provided on the camera is pressed one time to read to the camera the information which the user wishes to input with respect to the photography previously selected in correspondence with the chart 201. If the confirmation switch 11 is pressed after this input operation, the present setting including the read information is displayed through the display means 9.

The information inputting operation of the embodiment shown in FIG. 1 will be described below with reference to the flow chart of FIG. 4.

When the power source for the camera is turned on, the microcomputer 8 reads out various categories of photography control information stored in the non-volatile memory, i.e., the EEPROM 12, including information set by the user; and it forwards the read information to the camera control RAM in step F1.

For example, a program line for automatically determining the shutter speed and the aperture value at the time of program photography is set as information set by the user. Three program lines, i.e., a standard mode line, a high speed mode line and a low speed mode line are previously stored in the ROM in the microcomputer 8. The EEPROM 12 has a program line setting area in which information on which program line is presently selected is stored. This information is sent from this area to the RAM in the microcomputer 8. The content of the program line setting area indicates the standard program if it is 00, the high speed program if it is 01, or the low speed program if it is 02. Accordingly, it is possible to set the desired program mode on the camera side by referring to the data stored in the program line setting area and sent to the RAM.

Digital data items corresponding to the outputs from the five light receiving elements 1 to 5 are successively read in step F2 and the process proceeds to step F3. In step F3, the on/off state of the input switch 10 is discriminated. If the switch 10 is off, the process proceeds to step F4 to effect exposure calculation based on photometry data read for ordinary photography. Then, in step F5, the state of the confirmation switch 11 is discriminated. If the switch 11 is off, the exposure value is displayed in step F6. If the switch 11 is on, the present state of setting of the information input by the user is displayed in step F7. The process then returns to step F2 to form a basic processing loop.

If it is determined in step F3 that the input switch 10 is on, the process proceeds to step F8 to discriminate the levels of the five photometry data items, and then proceeds to step F9 to determine the order of the luminances represented by the photometry data items. Thereafter, the information on the photometry data luminance order is decoded in step F10 and the user information stored in a part of the ROM is extracted in step F11 according to the result of decoding. In step F12, the content of a part of the RAM is replaced with the data the decoded in step F10. For example, in a case where information for setting the program line to the high speed mode is decoded in step F10, high speed mode information is extracted from the ROM, and the present content of the program line area of the RAM, e.g., standard mode information 00 is replaced with high speed mode information 01. Further, in step F13, the user information decoded in step F10 is stored in an address of the EEPROM 12 corresponding to the data replacement address of the RAM. The process then returns to step F2. For example, if the content of the program line setting area of the RAM is changed from the standard mode 00 to the high speed mode 01, the content of the program line setting area of the EEPROM 12 is also changed from the present standard mode 00 to the high speed mode 01 based on the result of decoding. This data storage in the user setting area of the EEPROM 12 based on the result of decoding ensures that the information set by the user can be maintained when the camera power source is turned off, and that the same information set by the user can be used by being transferred to the camera control RAM when the power source is turned on next.

As described above, one user setting information item is provided in correspondence with one chart, and a program for discriminating user information items based on the difference between the luminosity orders of the chart division patterns is prepared in the microcomputer of the camera, thereby enabling 5 factorial = 120 items of information at the maximum to be supplied as user information.

Alternatively, each chart may be formed as a black-white combination chart and a signal obtained from this chart may be converted into binary digits to form 5 bit digital information, thereby providing 32 items of user setting information.

It is also possible to provide two or more user setting information items in correspondence with one chart and to change over these information items on the camera side.

Figure 5:
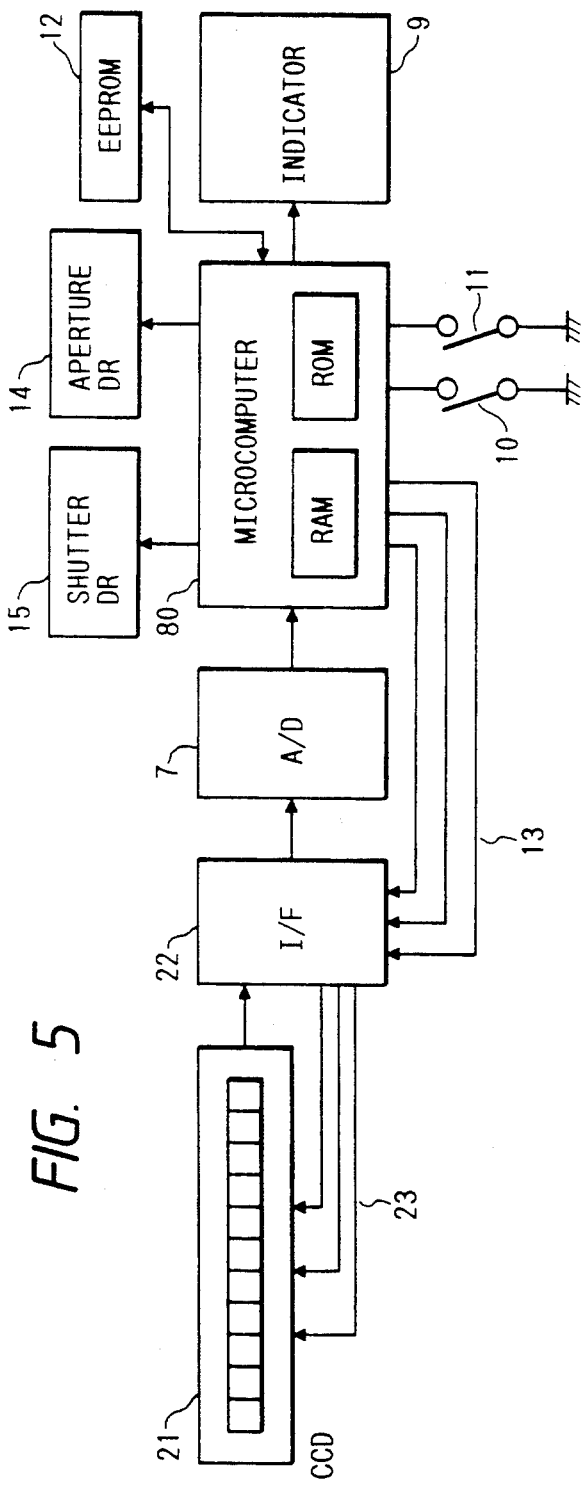
FIG. 5 is a block diagram of a second embodiment of the present invention.

FIG. 5 is a block diagram of a second embodiment of the present invention.

A CCD line sensor 21 shown in FIG. 5 is used to detect the focal point. It is capable of separately measuring object luminance distribution determined by two beams symmetrical on the optical axis with respect to a certain part of the field, i.e., a distance metering region. In the embodiment shown in FIG. 5, the focal point detecting CCD line sensor 21 also serves as a plurality of light receiving elements for detecting light-shade patterns of charts used to input information.

Figure 6:
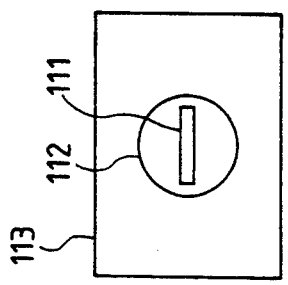
FIG. 6 is a diagram of a finder screen in accordance with the second embodiment.

The position on the film surface corresponding to the CCD line sensor 21 is expressed as a rectangle 111 in a circle 112 indicated in a field frame 113 of the finder screen, as shown in FIG. 6.

The CCD line sensor 21 is controlled, by driving clock lines 23 supplied from a sensor interface (I/F) 22, with respect to charging and transfer, and a train of output signals is supplied to an A/D converter 7 through the interface 22. At the interface 22, the clock supplied to the CCD 21 and the output timing and so on are controlled by control signals from a microcomputer 80. The A/D converter 7 converts the signal train output from the CCD line sensor 21 into a digital signal and supplies this converted signal to the microcomputer 80. Ordinarily, the microcomputer 80 calculates the amount of defocus on the film surface from the train of data items output from the CCD line sensor 21, and drives an automatic focus lens (not shown) on the basis of the result of the calculation to focus the lens automatically. A display means 9 is supplied with display data from the microcomputer 80 and ordinarily displays an exposure value and so on required for use of the camera. An input switch 10, a confirmation switch 11, and EEPROM 12, an aperture driving device 14 and a shutter driving device 15 are also provided and are the same as the corresponding components shown in FIG. 1.

The operation of inputting categories of information used for photography in the case of the embodiment shown in FIG. 5 will be described below.

Figure 7:
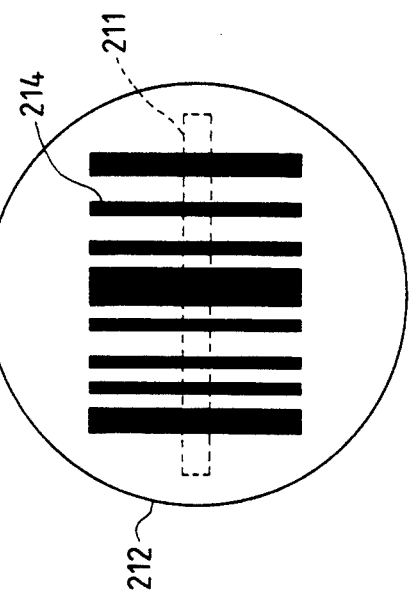
FIG. 7 is a diagram of a chart used in the second embodiment to input information set by the user.

First, a chart specially used to input user information will be described below. For example, a chart in the embodiment shown in FIG. 5 has a positioning circle 212 and a bar code 214 which is formed in the circle 212 to represent information having a predetermined number of digits, as shown in FIG. 7. A plurality of charts of this type are prepared according to the categories of information set by the user.

The photographer places one chart for inputting user information in front of a camera which has the system in accordance with the embodiment shown in FIG. 5 and to which a suitable lens is attached, and adjusts the direction and the range of the camera so that the circle 212 formed on the chart generally coincides with the circle 112 formed on the finder screen (which circle 112 may also serve as a circle which is conventionally used to indicate the photometry area). At this time, the corresponding position of the CCD line sensor 21 is positioned relative to the bar code 214 as indicated by the broken line 211, thereby enabling the light-shade pattern of the bar code 214 to be entirely read by the CCD line sensor 21. In this state, an input button provided on the camera is pressed one time to turn on the input switch 10, and user photography information contained in the chart is thereby read to and set in the camera. If a confirmation button is pressed to turn on the confirmation switch 11, the present setting including the information set by the user and read to the camera is displayed through the display means 9 of the camera.

Figure 8:
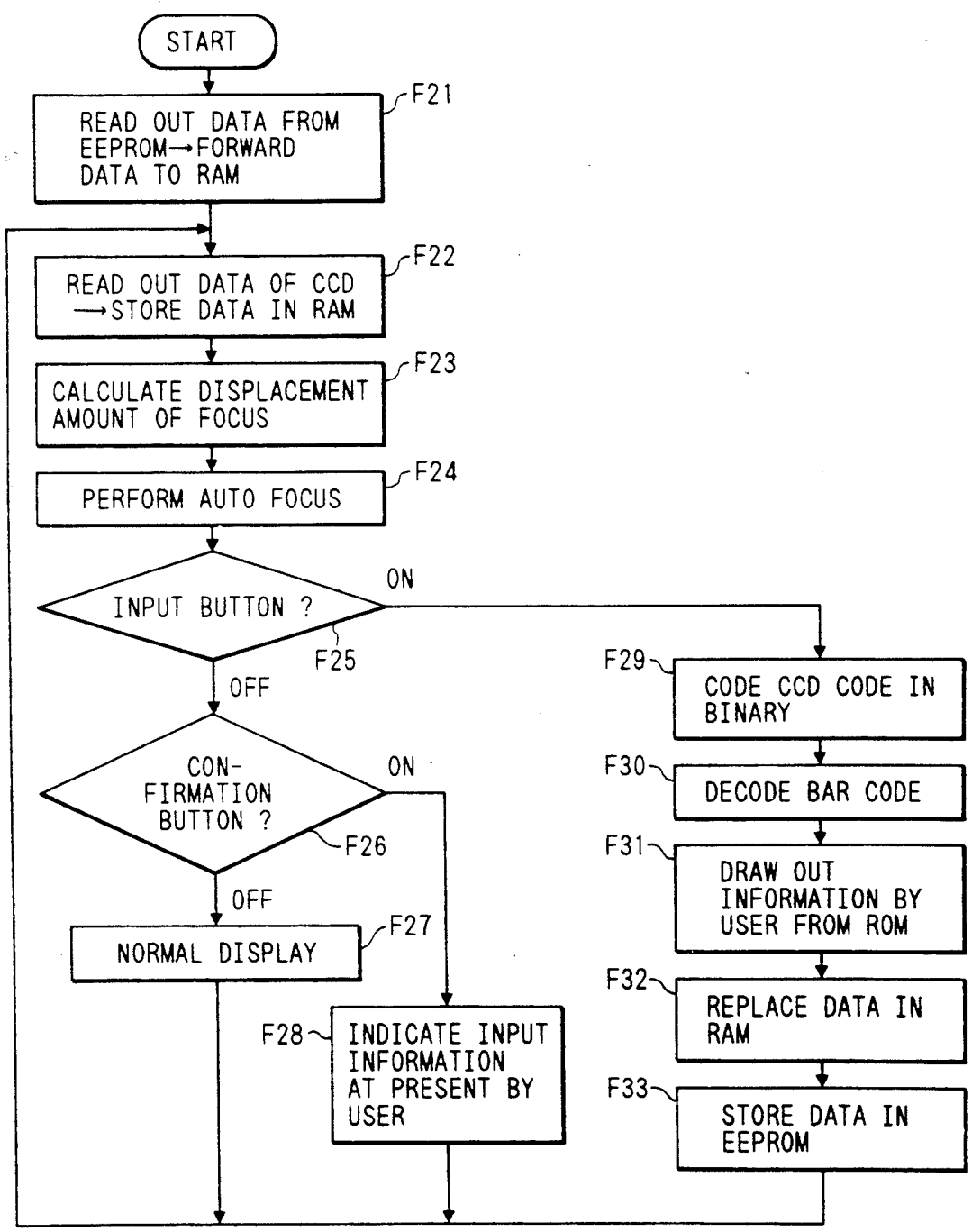
FIG. 8 is a flow chart of the operation of the second embodiment under the control of a microcomputer.

The operation of the embodiment shown in FIG. 5 will be described below with reference to the flow chart of FIG. 8.

When the power source is turned on, the microcomputer 8 reads out various categories of set information including information set by the user from the EEPROM 12 and forwards the read information to the camera control RAM in step F21. Digital data items corresponding to the output from the CCD line sensor 21 are successively read in step F22, the amount of defocus is calculated in step F23, and automatic focusing is effected in step F24. In step F25, the state of the input switch 10 is discriminated. If the input switch 10 is off, the flow branches off to step F26 to discriminate the state of the confirmation switch 11. If the confirmation switch 11 is off, ordinary display is effected in step F27. If the switch 11 is on, the present setting of the user information is displayed in step F28. The process then returns to step F22 to form a basic loop.

If it is determined in step F25 that the input switch 10 is on, the process proceeds to step F29 to convert CCD data already read and stored in the RAM into binary digits by using a predetermined threshold value. In step F30, the bar code pattern converted into binary digits is decoded, and operations of process steps F31 to F33 which are the same as those of F11 to F13 of the first embodiment are executed according to the decoding result. The process then returns to step F22

As described above, one user setting information item is provided in correspondence with one chart, and a program for discriminating user information based on the bar code written in each chart is provided in the microcomputer of the camera, thereby enabling supply of information having a number of digits determined by the number of elements of the CCD line sensor.

In the embodiment described above, one chart is prepared for one information item set by the user. However, patterns representing a plurality of information items set by the user may be formed in one chart.

As will be appreciated from the foregoing description, in accordance with the present invention, the light receiving elements for automatic exposure and automatic focusing also serve as light receiving elements for detecting patterns There is therefore no need for a special detection means and contacts for input operation, and the camera cost can be minimized. The present invention can also be applied to electronic still cameras having a two-dimensional image sensor such as a CCD.

What is claimed is:

1. A camera comprising:
   photometry means for dividing an object field to be photographed into a plurality of regions and effecting photometry with respect to said plurality of regions through a photographing lens, and for outputting a photometry signal in accordance with intensities of light in said plurality of regions;
   calculating means for calculating an exposure value on the basis of said photometry signal;
   detection means for detecting photography information encoded as a pattern on a chart, by decoding the pattern based on the photometry signal output by said photometry means when the chart is positioned in the object field;
   memory means;
   means for storing in said memory means for information detected from the chart by said detection means; and
   operation control means for controlling operation of the camera on the basis of the information stored in said memory means.

2. A camera according to claim 8, wherein said detection means determines an order of the intensities of light in said plurality of regions on the basis of the photometry signal output by said photometry means when the chart is positioned in the object field.

3. A camera according to claim 2, wherein said detection means decodes said pattern according to the determined order of intensities of light in said plurality of regions.

4. A camera according to claim 1, wherein said memory means comprises non-volatile memory means for retaining the information detected by said detection means after a power supply of the camera has been turned off, so as to enable said operation control means to control operation of the camera in accordance with the retained information when the power supply is subsequently turned on.

5. A camera system comprising:
   a chart having an encoded pattern indicating information with respect to an operation of a camera; and
   a camera including
   photometry means for dividing an object field to be photographed into a plurality of regions and effecting photometry with respect to said plurality of regions through a photographing lens, and for outputting a photometry signal in accordance with intensities of light in said plurality of regions;

calculating means for calculating an exposure value on the basis of said photometry signal, detection means for detecting said information from said chart by decoding said pattern based on the photometry signal output by said photometry means when said chart is positioned in the object field, memory means, means for storing in said memory means the information detected from said chart by said detection means, and operation control means for controlling operation of the camera on the basis of the information stored in said memory means.

6. A camera system according to claim 5, wherein said pattern is divided into regions corresponding to said plurality of regions of the object field.

7. A camera system according to claim 6, wherein said regions of said pattern are of corresponding shape and arrangement to said plurality of regions of the object field.

8. A camera system according to claim 6, wherein said detection means determines an order of the intensities of light in said plurality of regions of the object field on the basis of the photometry signal output by said photometry means when said chart is positioned in the object field.

9. A camera system according to claim 8, wherein said detection means decodes said pattern according to the determined order of intensities of light in said plurality of regions of the object field.

* * * * *